(12) United States Patent
Barnicki et al.

(10) Patent No.: US 10,280,281 B2
(45) Date of Patent: *May 7, 2019

(54) PROCESSES FOR FORMING VULCANIZABLE ELASTOMERIC FORMULATIONS AND VULCANIZED ELASTOMERIC ARTICLES

(71) Applicant: Eastman Chemical Company, Kingsport, TN (US)

(72) Inventors: Scott Donald Barnicki, Kingsport, TN (US); Frederick Ignatz-Hoover, Elyria, OH (US); Robert Thomas Hembre, Johnson City, TN (US); Andrew Neil Smith, Wadsworth, OH (US); Henk Kreulen, Halsteren (NL); Aruna M. Velamakanni, Copley, OH (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,094

(22) Filed: Jul. 25, 2017

(65) Prior Publication Data

US 2017/0321033 A1 Nov. 9, 2017

Related U.S. Application Data

(63) Continuation-in-part of application No. 15/015,165, filed on Feb. 4, 2016, now Pat. No. 10,011,663.

(51) Int. Cl.

| | |
|---|---|
| *C08K 3/30* | (2006.01) |
| *C08J 3/24* | (2006.01) |
| *C08K 5/36* | (2006.01) |
| *C01B 17/02* | (2006.01) |
| *C01B 17/06* | (2006.01) |
| *C08C 19/20* | (2006.01) |
| *C08K 3/06* | (2006.01) |
| *C08K 5/47* | (2006.01) |
| *C08K 3/011* | (2018.01) |

(52) U.S. Cl.
CPC ............ *C08K 3/30* (2013.01); *C01B 17/02* (2013.01); *C01B 17/0232* (2013.01); *C01B 17/06* (2013.01); *C08C 19/20* (2013.01); *C08J 3/24* (2013.01); *C08K 3/011* (2018.01); *C08K 3/06* (2013.01); *C08K 5/36* (2013.01); *C08K 5/47* (2013.01); *C08J 2307/00* (2013.01)

(58) Field of Classification Search
CPC .......... C08C 19/20; C08K 3/06; C08K 3/011; C08K 3/30; C08J 3/24
See application file for complete search history.

(56) References Cited

U.S. PATENT DOCUMENTS

| | | |
|---|---|---|
| 1,875,372 A | 9/1932 | Endres |
| 2,419,309 A | 4/1947 | Belchetz |
| 2,419,310 A | 4/1947 | Belchetz |
| 2,460,365 A | 2/1949 | Schallis |
| 2,462,146 A | 2/1949 | Walcott et al. |
| 2,513,524 A | 7/1950 | Schallis |
| 2,534,063 A | 12/1950 | Ross et al. |
| 2,757,075 A | 7/1956 | Haimsohn |
| 3,844,941 A | 10/1974 | Jones |
| 3,891,743 A | 6/1975 | Block |
| 4,017,467 A | 4/1977 | Doss |
| 4,238,470 A | 12/1980 | Young |
| 4,242,472 A | 12/1980 | Hoshino et al. |
| 4,740,559 A | 4/1988 | Johansson et al. |
| 4,752,507 A | 6/1988 | Johansson et al. |
| 4,870,135 A | 9/1989 | Mowood et al. |
| 6,319,993 B2 | 11/2001 | Weidenhaupt et al. |
| 6,420,581 B1 | 7/2002 | Lodaya et al. |
| 6,441,098 B2 | 8/2002 | Halko et al. |
| 6,624,274 B1 | 9/2003 | Suddaby |
| 7,569,639 B2 | 8/2009 | Choi et al. |
| 7,662,874 B2 | 2/2010 | Korth et al. |
| 8,859,719 B2 | 10/2014 | Mohamed et al. |
| 10,011,663 B2 | 7/2018 | Barnicki et al. |
| 2014/0020808 A1* | 1/2014 | Watanabe ............ B60C 1/00 152/525 |
| 2014/0116594 A1 | 5/2014 | Miyazaki |
| 2014/0200383 A1 | 7/2014 | Marks et al. |
| 2014/0213708 A1 | 7/2014 | Kushida |

(Continued)

FOREIGN PATENT DOCUMENTS

| | | |
|---|---|---|
| CN | 101 837 958 A | 9/2010 |
| CN | 103 601 156 A | 2/2014 |
| EP | 0846722 B1 | 4/2002 |

(Continued)

OTHER PUBLICATIONS

Notice of Allowance dated Mar. 20, 2018 received in co-pending U.S. Appl. No. 15/440,056.
Notice of Allowance dated Mar. 26, 2018 received in co-pending U.S. Appl. No. 15/440,007.
Buskirk, P.R. Van, et al, Practacle Parameters for Mixing, Rubber Chemistry and Technology, vol. 48, pp. 577-591, May 1975.
Kim, Pan Soo, et al, Flow Visualization of Intermeshing and Separated Counter-Rotating Rotor Internal Mixer, Rubber Chemistry and Technology, vol. 67, pp. 880-891, Apr. 1994.
Manas-Zloczower, I. et al, Dispersive Mixing in Internal Mixers—A Theoretical Model Based on Agglomerate Rupture, vol. 55, pp. 1250-1285, 1982.
Office Action dated Nov. 22, 2017 received in co-pending U.S. Appl. No. 15/440,007.

(Continued)

*Primary Examiner* — Roberto Rabago
(74) *Attorney, Agent, or Firm* — Michael K. Carrier; John P. Foryt

(57) ABSTRACT

Processes for forming a vulcanizable elastomeric formulation are disclosed. The processes include the steps of mixing an elastomer with a vulcanizing agent to form a vulcanizable elastomeric formulation that includes the vulcanizing agent dispersed in the elastomeric compound, wherein the vulcanizing agent includes a cyclododecasulfur compound. A process for forming a vulcanized elastomeric article is also described.

16 Claims, No Drawings

(56) References Cited

U.S. PATENT DOCUMENTS

| | | | |
|---|---|---|---|
| 2017/0002153 A1* | 1/2017 | Osumi | C08L 27/16 |
| 2017/0253484 A1 | 9/2017 | Barnicki et al. | |

FOREIGN PATENT DOCUMENTS

| | | | |
|---|---|---|---|
| EP | 1500630 A2 | 1/2005 | |
| EP | 2128153 B1 | 8/2013 | |
| WO | WO 2003060002 | 7/2003 | |
| WO | WO 2015/098338 A1 * | 7/2015 | |

OTHER PUBLICATIONS

Office Action dated Nov. 24, 2017 received in co-pending U.S. Appl. No. 15/440,056.
ASTM D1993-03 (2013).
Bueno-Ferrer et al., Journal of Rare Earths, 28, 2010, "Relationship between surface area and crystal size of pure and doped cerium oxides", pp. 647-653.
Chen et al., "Quantitative Analysis of Powder Mixtures by Raman Spectrometry: the influence of particle size and its correction", Analytical Chemistry, 84, 2012, pp. 4088-4094.
Choi et al. "Thermal Aging Behaviors of Elemental Sulfur-Free Polyisoprene Vulcanizates" *Bull. Korean Chem. Soc.*, col. 26, 2005, pp. 1853-1855.
Eckert et al. "Elemental Sulfur and Sulfur-Rich Compounds" *Springer*, 2003, pp. 10-54.
Leste-Lasserre, Pierre "Sulfur Allotrope Chemistry" *McGill University*, 2001, pp. 119-132.
Masamichi Ikeda et al., Radioisotopes, "Measurements of Sulfure Solubility and Diffusibility in Rubber by Tracer Method", vol. 20, No. 10, p. 556, (1973).
Mausle, H.J.; Steudel, R., "Simple preparation of Cyclohexasulfur (S6) from dichlorodisulfane (S2Cl2) and ionic iodides", Z. anorg. allg. Chem. 463, 1980, pp. 27-31.
Steudel, R.; Strauss, R.; Koch, L., "Quantitative HPLC Analysis Thermodynamics of Sulfur Melts", Angew. Chem. Int. Ed. Engl., 24(1), 1985, pp. 59-60.
Steudel, R..; Mausle, H.-J., "Detection of Large-Ring Sulfur Molecules in Liquid Sulfur: Simple Preparation of S12, α-S18, S20 from S8", Angew. Chem. Int. Ed. Engl., 18(2), 1979, pp. 152-153.
Steudel, R.; Eckert, B., "Solid Sulfur Allotropes", Topics in Current Chemistry (2003), 230, pp. 1-79.
Steudel et al., "Infrared and Raman Spectra of Cyclo Dodecasulphur" Journal of Molecular Spectroscopy, 51, 1974, pp. 189-193.
Schmidt, M.; Block, H.-D., "Occurrence of Cyclododecasulfur in Sulfur Melts", Angew. Chem. Int. Ed. Engl., 6(11), 1967, pp. 955-956.
Schmidt, M.; Wilhelm, E., "Cyclodocecasulfur, S12", Angew. Chem. Int. Ed. Engl., 5(11), 1966, pp. 964-965.
Steudel, R.; Steidel, J.; Sandow, T., "Representation, Crystal Structure and Vibrational Spectra of CycloUndecasulfur and Cyclotridecasulfur", Z. Natureforsch B 1986, 41, pp. 958-970.
Schmidt, M.; Knippschild, G.; Wilhelm, E., "Memorandum on a Simplified Synthesis of Cyclododecasulfure $S_{12}$" Chem. Ber., 101 1968, p. 381-382.
Schmidt, M.; Block, B.; Block, H.D.; Kopf, H.; Wilhelm, E., "Cycloheptasulfur, S7, and Cyclodocecasulfur, S10—Two New Sulfur Rings", Angew. Chem. Int. Ed. Engl., 7(8), 1968, pp. 632-633.
Inorganic Chemistry by Duward Shriver, P.W. Atkins and Cooper Langford, W. H. Freeman & Co., 1990, pp. 407-408.
Copending U.S. Appl. No. 15/015,165, filed Feb. 4, 2016, Barnicki, et al.
Office Action dated Jul. 5, 2016 received in co-pending U.S. Appl. No. 15/015,165.
Office Action dated Jan. 13, 2017 received in co-pending U.S. Appl. No. 15/015,165.
Copending U.S. Appl. No. 15/440,056, filed Feb. 23, 2017, Barnicki, et al.
Copending U.S. Appl. No. 15/440,007, filed Feb. 23, 2017, Barnicki, et al.
Steudel, Ralf, "Elemental Sulfur and Related Homocyclic Compounds and Ions", Studies in Inorganic Chemistry, 1984, v5, p. 3.
PCT International Search Report and Written Opinion dated Mar. 23, 2017 for International Application No. PCT/US2016/067695.
Steudel et al, Thermal Polymerization and Depolymerization Reactions of 10 Sulfer Allotropes Studied by HPLC and DSC, vol. 517, No. 10, pp. 7-42, Oct. 1, 1984.
PCT International Search Report and Written Opinion dated Apr. 19, 2017 for International Application No. PCT/US2017/019881.
Steudel, Ralph et al, "A New Allotrope of Elemental Sulfur: Convenient Preparation of cyclo-S 14 from S 8", Angew. Chem. Int. Ed., Jan. 1, 1998, pp. 2377-2378.
Moeckel, Herman, "Separation of dihydrogen polysulfides (polysulfanes) using reversed-phase HPLC", Fresenius' Zeitschrift Fuer Analytische Chemie, vol. 318, No. 2, 1984, pp. 116-120.
Zysman-Colman, Eli et al., "Probing the chemistry of rare sulfur allotropes: S9, S12 and S26", Journal of Sulfur Chemistry, vol. 29, No. 3-4, 2008, pp. 309-326.
PCT International Search Report and Written Opinion dated May 11, 2017 for International Application No. PCT/US2017/019888.
Office Action dated Jun. 30, 2017 received in co-pending U.S. Appl. No. 15/015,165.
Office Action dated Aug. 27, 2018 received in co-pending U.S. Appl. No. 15/991,122.
Copending U.S. Appl. No. 16/123,591, filed Sep. 6, 2018, Barnicki et al.
PCT International Search Report and Written Opinion dated Oct. 9, 2018 for International Application No. PCT/US2018/042402.
Kuznetsov, A. A. et al., "Investigation of the process of vulcanization bypolymeric Sulphur in the metastable state", International Polymer Science and Technology, vol. 29, No. 1, Jan. 2002, pp. T/1-3.
Znak, Z.O, et al. Physicochemical Properties of Rubber Compositions Vulcanized by Polymeric Sulfur, Materials Science, vol. 52, No. 3, Nov. 2016, pp. 407-413.
Copending U.S. Appl. No. 15/995,574, filed Jun. 1, 2018, Barnicki et al.
Notice of Allowance dated May 3, 2018 received in co-pending U.S. Appl. No. 15/015,165.
Copending U.S. Appl. No. 15/991,122, filed May 29, 2018, Barnicki et al.

* cited by examiner

PROCESSES FOR FORMING VULCANIZABLE ELASTOMERIC FORMULATIONS AND VULCANIZED ELASTOMERIC ARTICLES

RELATED APPLICATIONS

This continuation-in-part application claims the priority of U.S. Nonprovisional Patent Application Ser. No. 15/015,165 filed Feb. 4, 2016, now U.S. Pat. No. 10,011,663, and entitled "VULCANIZING COMPOSITION CONTAINING CYCLODODECASULFUR AND IMPROVED CYCLODODECASULFUR COMPOUND", the entire disclosure of which is incorporated herein by reference.

FIELD OF THE INVENTION

The present invention relates generally to (i) processes for forming a vulcanizable elastomeric formulation, (ii) processes for forming a vulcanized elastomeric article, and (iii) formulations or vulcanizable compositions beneficial to mixing, extruding, calendaring, shaping, forming, and curing said elastomeric article.

BACKGROUND OF THE INVENTION

Sulfur vulcanization is a well-known chemical process for converting natural rubber or other general purpose elastomers into more durable materials via the formation of crosslinks between individual polymer chains through addition of and reaction with certain vulcanizing agents (also known as "sulfur-containing curatives"). In conventional processes for the manufacture of durable vulcanized elastomeric articles, a sulfur-containing curative is mixed with an elastomeric compound to form a vulcanizable elastomeric formulation that includes the sulfur-containing curative. The vulcanizable elastomeric formulation is subjected to a number of processing steps such as for example mixing, extruding, calendering, shaping, forming and building into the shape(s) of a desired "green" (unvulcanized) article or article component ("article"). The article is then subjected to conditions necessary to vulcanize the elastomer and form a vulcanized elastomeric article.

Current industry practice has embraced polymeric sulfur as a preferred vulcanizing agent in many commercial sulfur vulcanization processes. For example, U.S. Pat. No. 4,238,470, the disclosure of which is incorporated herein by reference, describes the use of polymeric sulfur as a sulfur vulcanizing agent for a vulcanizable elastomeric composition. Polymeric sulfur is generally characterized by a high molecular weight, a long, helical molecular structure and insolubility in carbon disulfide and other strong solvents as well as in rubber, rubber compounds and elastomers. In a typical sulfur vulcanization process step, a vulcanizable elastomeric formulation containing polymeric sulfur is subjected to conditions in which the polymeric sulfur converts to cyclooctasulfur ($S_8$), a sulfur allotrope that is soluble in elastomers and oils and which therefore dissolves into the elastomeric formulation wherein it can take part in the vulcanization reactions.

Because the conversion of polymeric sulfur to cyclooctasulfur is temperature dependent and the effects of time and temperature on the conversion are cumulative, great care must be taken to ensure that the processing steps prior to final shaping, building or assembling of the vulcanized article prior to actual vulcanization do not initiate the conversion prior to the actual vulcanization step. Such premature conversion could result in sulfur "bloom", a known phenomenon highly detrimental to interply adhesion and other vulcanized article characteristics. Sulfur bloom is the result of diffusion of soluble cyclooctasulfur and subsequent crystallization of sulfur on the surface of an uncured article and occurs when cyclooctasulfur concentrations in the green vulcanizable elastomeric formulation exceed their solubility limit in the formulation at a given temperature. The presence of sulfur bloom on the surface on an uncured article component or ply is highly detrimental to tack and adhesion of that component to other components or plies. In order to avoid premature conversion to cyclooctasulfur and the risk of bloom in vulcanizable elastomeric formulations with polymeric sulfur vulcanizing agents, current commercial practice includes limiting extended processing times to temperatures below about 110° C. or more preferably 100° C., as even a small percentage of conversion of polymeric sulfur to cyclooctasulfur may push the concentration past the solubility limit and create the potential for bloom. The shearing actions present in (and frictional heat generated by) the mixing, extrusion, calendering, shaping, forming, or other processing operations therefore present demanding temperature control challenges to the article manufacturers.

Management of these challenges typically involves a delicate balance between productivity, throughput, processing speed and product cost on one hand and product performance and quality on the other. Limitations implemented to reduce risk of premature polymeric sulfur conversion and bloom slow the manufacturing speed and thus reduce manufacturer profitability. Conversely a vulcanizing agent with less premature conversion propensity (and accordingly higher thermal stability) would increase manufacturing speed and accordingly the number of units a plant can create and the manufacturer's profit. In addition to faster manufacturing speeds, if the conversion from polymeric to cyclooctasulfur at any given temperature in the manufacturing process could be reduced, then the compounder has greater flexibility to incorporate more sulfur into a vulcanizable composition thereby having greater potential to manufacture goods of even higher quality and durability.

The prior art has attempted to improve polymeric sulfur thermal stability and retard or resist sulfur bloom through use of various stabilizers or stabilization treatments, as described for example in the above-mentioned '470 patent as well as U.S. Pat. Nos. 2,460,365; 2,462,146 and 2,757,075. Despite all these efforts, a continuing need exists for sulfur vulcanizing agents with higher thermal stability that translates to improved throughput and efficiency for vulcanized article manufacturers while avoiding the risks and detriments of bloom.

SUMMARY OF THE INVENTION

In a first aspect, the present invention relates to a vulcanizing composition having improved thermal stability in a vulcanizable elastomeric compound usable to form a vulcanized elastomeric article. The vulcanizing composition generally includes a vulcanizing agent wherein the vulcanizing agent includes a cyclododecasulfur compound. The composition optionally further includes a carrier. Preferably, the cyclododecasulfur compound is characterized by a melt point onset of from about 155° C. to about 167° C. when measured according to the well-established method of differential scanning calorimetry (hereafter referred to as DSC melt point onset) when measured at a DSC heat rate of 20° C./minute.

In another aspect, the present invention relates to a vulcanizable elastomeric formulation that includes at least one elastomer and a vulcanizing agent wherein the vulcanizing agent includes a cyclododecasulfur compound. Preferably, the cyclododecasulfur compound is characterized by a DSC melt point onset of from 155° C. to 167° C. when measured at a DSC heat rate of 20° C./minute.

In another aspect, the present invention relates to a vulcanizing agent masterbatch that includes a vulcanizing agent in an elastomeric carrier, wherein the vulcanizing agent includes a cyclododecasulfur compound.

In yet another aspect, the present invention relates generally to a cyclododecasulfur compound that exhibits an elevated melting point relative to known forms of cyclododecasulfur and other features desirable when the cyclododecasulfur is used as a vulcanizing agent in a vulcanizing composition for vulcanizable elastomers. More specifically, the present invention is directed to a cyclododecasulfur compound characterized by a DSC melt point onset of from 155° C. to 167° C. when measured at a DSC heat rate of 20° C./minute.

In still another aspect, the present invention relates to a process for forming a vulcanizable elastomeric formulation. This process generally includes the steps of mixing an elastomer with a vulcanizing agent to form a vulcanizable elastomeric formulation that includes the vulcanizing agent dispersed in the elastomeric compound, wherein the vulcanizing agent includes a cyclododecasulfur compound. Preferably, the cyclododecasulfur compound is characterized by a DSC melt point onset of from about 155° C. to about 167° C. when measured at a DSC heat rate of 20° C./minute. As the vulcanizing agent cyclododecasulfur compound is preferably mixed with the elastomer as a component of a vulcanizing composition, the mixing step of the process preferably includes combining a vulcanizing composition with an elastomeric compound to form a vulcanizable elastomeric formulation, wherein the vulcanizing composition includes a cyclododecasulfur compound.

In still yet another aspect, the present invention is directed to a process for forming a vulcanized elastomeric article. The process includes (a) mixing an elastomer with a vulcanizing agent to form a vulcanizable elastomeric formulation that includes the vulcanizing agent dispersed in the elastomeric compound; (b) forming the vulcanizable elastomeric formulation into a formed shape; and (c) vulcanizing the formed shape to form a vulcanized elastomeric article; wherein at least one of the mixing and forming steps includes increasing the bulk average processing temperature of the vulcanizable elastomeric formulation to greater than 125° C. for at least a portion of the step.

In yet still another aspect, the present invention is directed to a process for forming a vulcanized elastomeric article wherein the process includes (a) mixing an elastomer with a vulcanizing agent to form a vulcanizable elastomeric formulation that includes the vulcanizing agent dispersed in the elastomeric compound, wherein the vulcanizing agent includes a cyclododecasulfur compound; b) forming the vulcanizable elastomeric formulation into a formed shape; and (c) vulcanizing the formed shape to form a vulcanized elastomeric article.

Further aspects and areas of applicability will become apparent from the description provided herein. It should be understood that the description and specific examples are intended for purposes of illustration only and are not intended to limit the spirit and scope of the present invention.

DETAILED DESCRIPTION

As utilized herein, the following terms or phrases are defined as follows:

"Cyclododecasulfur compound" means a cyclic allotrope of sulfur in which twelve sulfur atoms are formed into a single homocyclic ring, also referred to herein as $S_{12}$.

"Elastomer" means any polymer which after vulcanization (or crosslinking) and at room temperature can be stretched, compressed or sheared under stress and, upon immediate release of the stress, will return with force to approximately its original proportionate dimensions, including without limitation rubber.

"Vulcanizing Agent" means a material efficacious in effecting vulcanization of a vulcanizable formulation when under vulcanization conditions.

"Vulcanizing Composition" means a combination of ingredients usable as an additive to effect vulcanization of a vulcanizable formulation under vulcanization conditions.

"Vulcanizable Elastomeric Formulation" means a composition that includes a vulcanizing agent and an elastomer and that is capable of vulcanization when placed under vulcanization conditions.

In a first aspect, the present invention is directed to a vulcanizing composition for use in forming a vulcanized article. The composition includes a vulcanizing agent wherein the vulcanizing agent includes a cyclododecasulfur compound. It has been unexpectedly discovered that the vulcanizing agent in the vulcanizing composition of the present invention demonstrates improved thermal stability in a vulcanizable formulation usable to form a vulcanized article. In a preferred embodiment, the vulcanizable formulation is a vulcanizable elastomeric formulation and the vulcanized article is a vulcanized elastomeric article.

Preferably, the vulcanizing agent of the vulcanizing composition of the present invention includes a cyclododecasulfur compound characterized by a DSC melt point onset of from 155° C. to 167° C. when measured at a DSC heat rate of 20° C./minute.

The vulcanizing composition of the present invention may further include a carrier. Suitable carriers for the vulcanizing composition are typically non-elastomeric and substantially inert with respect to the cyclododecasulfur of the present invention and may include any one or more additional ingredients for example process oil, stearic acid, cellulosic binder such as a carboxymethylcellulose, cellulose ether or esters, xanthans and the like, vegetable oil, epoxidized vegetable oil, polymeric binder or dispersing agent such as a general purpose elastomer or olefinic polymer or copolymer.

The vulcanizing agent in the vulcanizing composition of the present invention preferably includes from about 20% to 100% by weight, more preferably from about 40% to about 100% by weight, cyclododecasulfur compound based on the total weight of the vulcanizing composition. While these ranges are preferred, it will be understood by one of ordinary skill that vulcanizing compositions with amounts of cyclododecasulfur compound lower than the preferred ranges may be contemplated when the vulcanizing composition further includes as a component of the vulcanizing agent other known vulcanizing agents such as sulfur-containing curatives, for example polymeric sulfur, cyclooctasulfur and the like, as well as non-sulfur based curatives such as peroxides. A preferred vulcanizing composition of the present invention therefore includes a vulcanizing agent that optionally further includes one or more sulfur-containing curatives selected from the group consisting of polymeric sulfur and cyclooctasulfur.

The vulcanizing composition may also include one or more optional ingredients that are listed below as optional ingredients for the vulcanizable elastomeric formulation of the present invention, such as polymeric sulfur, flow aids, fatty acids, zinc oxide, accelerators, activators, prevulcanization inhibitors, acid retarders, antidegradants, antireversion agents, prevulcanization inhibitors, plasticizers or other compounding ingredients or additives to further enhance the characteristics and/or improve the performance of the vulcanizing composition, the processability of the elastomeric formulation, the elastomeric formulation of which it is a component or the elastomeric article formed from the elastomeric formulation. In one embodiment, the vulcanizing composition includes at least one of an antireversion agent and a prevulcanization inhibitor. Suitable antireversion agents and prevulcanization inhibitors and retarders are described below with respect to the vulcanizable elastomeric formulation of the present invention. Particularly suitable antireversion agents are selected from the group consisting of hexamethylene-1,6-bis(thiosulfate), disodium salt, dihydrate and 1,3-bis(citraconamidomethyl)benzene while a particularly suitable prevulcanization inhibitor is N-(cyclohexylthio)-phthalimide.

As discussed above, the vulcanizing composition of the present invention is preferably useful in an embodiment wherein the vulcanizable formulation is a vulcanizable elastomeric formulation and the vulcanized article is a vulcanized elastomeric article. Accordingly, in another aspect, the present invention is directed to a vulcanizable elastomeric formulation. The vulcanizable elastomeric formulation of the present invention includes at least one elastomer and a vulcanizing agent, wherein the vulcanizing agent is a cyclododecasulfur compound. Preferably, the cyclododecasulfur compound is characterized by a DSC melt point onset of from about 155° C. to about 167° C. when measured at a DSC heat rate of 20° C./minute. Preferably, the cyclododecasulfur compound is added to the elastomer by mixing a vulcanizing composition that includes the vulcanizing agent as a component with the elastomer such that the vulcanizable elastomeric formulation of the present invention preferably includes at least one elastomer and the vulcanizing composition of the present invention.

The elastomer may be any vulcanizable unsaturated hydrocarbon elastomer known to one skilled in the art. These elastomers may include but not be limited to natural rubber (NR), styrene-butadiene rubber (SBR), butadiene rubber (BR), nitrile rubber (NBR), ethylene propylene (EP) or ethylene propylene diene terpolymers (EPDM), 1,4-cis polybutadiene, polychloroprene, 1,4-cis polyisoprene, optionally halogenated or non-halogenated isoprene-isobutene copolymers, butadiene-acrylonitrile, styrene-butadiene-isoprene terpolymers and the like and derivatives and mixtures thereof. The vulcanizable elastomeric formulation may optionally also include one or more other additives or additive mixtures conventionally used in elastomer and rubber processing and vulcanized elastomeric article manufacture. Non-limiting examples of such additives include flow improvers, processing aids, mold lubricants and corrosion inhibitors, tackifiers, homogenizers, antioxidants, antidegradants, antiozonants, anti-fatigue agents, accelerators, extenders and fillers, adhesion promoters, activators, bonding agents, buffers, fillers, pigments, antireversion agents, prevulcanization inhibitors, acid retarders, plasticizers or other compounding ingredients or additives and combinations and mixtures thereof that further enhance the processing characteristics and/or improve the performance of the elastomeric formulation or the elastomeric article from which it is formed. Suitable flow aids, processing aids and lubricants include fatty acids, fatty acid soaps including zinc soaps, fatty acid amides, fatty acid esters and their derivatives, silicon dioxide, pumice, stearate and general rubber processing oils. Suitable fillers and extenders include carbon black, gypsum, kaolin, bentonite, titanium dioxide, silicates of various types, silica, clay, calcium carbonate, and the like.

Suitable accelerators may include, but not be limited to guanidines such as N,N'-di-ortho-tolylguanidine and di-ortho-tolylguanidine salt of dicatechol borate; thiazoles such as 2-mercaptobenzothiazole disulfide, 2-mercaptobenzothiazole and zinc 2-mercaptobenzothiazole; sulfenamides such as N-oxydiethylene-2-benzothiazole sulfenamide, N-oxydiethylene thiocarbamyl-N'oxydiethylene sulfenamide and N-cyclohexyl-2-benzothiazolesulfenamide, N-t-butyl-2-benzothiazolesulfenamide, N-dicylcohexyl-2-benzothiazolesulfenamide; sulfenimides, dithiocarbamates such as bismuth, copper, zinc, selenium or tellurium dimethyldithiocarbamate, zinc diethyldithiocarbamate and zinc dibutyldithiocarbamate; xanthates such as zinc isopropyl xanthanate; thiurams such as tetrabutylthiuram disulfide, tetramethylthiuram monosulfide, dipentamethylenethiuram hexasulfide and tetraethylthiuram disulfide; thioureas such as trimethylthiourea, 1,3-diethylthiourea and 1,3-dibutylthiourea, and combinations and mixtures thereof.

The vulcanizable elastomeric formulation may optionally also include one or more other additives or additive mixtures conventionally used in elastomer and rubber processing and vulcanized elastomeric article manufacture specifically for the purpose of improving processability or the improvement of properties of the vulcanized elastomeric composition. Improvements in processability can be achieved by the addition of retarders, conventionally acidic substances of the traditionally defined Brondsted or Lewis acid types, as one skilled in the art will immediately recognize that these chemicals slow the rate of vulcanization including the time to the onset of scorch and the rate of vulcanization which will allow for additional increased processing temperature and or higher rates of process. Further improvements in processability will be gained by the judicious combination of prevulcanization inhibitors in the formulation along with cyclododecasulfur. Prevulcanization inhibitors allow for higher processing temperatures in order to overcome the problem of premature vulcanization commonly referred to as scorch in the industry. Scorch during processing renders the composition "elastic" and thus no longer plastic and suitable for further processing, shaping, forming or building operations. Suitable prevulcanization inhibitors are described for example in U.S. Pat. Nos. 3,427,319; 3,473,667; 3,546,185; 3,513,139; 3,562,225; 3,586,696; 3,686,169; 3,752,824; 3,775,428; and 3,855,262.

The vulcanizable elastomeric formulation may optionally be modified with anti-reversion agents, prevulcanization inhibitors and/or retarders such as N-(cyclohexylthio)-phthalimide and organic acids such as benzoic or salicylic acid modifiers and combinations or mixtures thereof. In one embodiment, the vulcanizable elastomeric formulation includes at least one of an antireversion agent and a prevulcanization inhibitor. Particularly suitable antireversion agents are selected from the group consisting of hexamethylene-1,6-bis(thiosulfate), disodium salt, di hydrate and 1,3-bis(citraconamidomethyl)benzene while a particularly suitable prevulcanization inhibitor is N-(cyclohexylthio)-phthalimide. Anti-reversion agents, such as for example the materials described in U.S. Pat. Nos. 4,605,590 and 5,426,155, improve the physical performance of sulfur vulcanized elastomeric compositions especially in high sulfur loading compositions, high temperature vulcanization conditions and or high temperature application environments. Without question then the combination of the cyclododecasulfur of the present invention with prevulcanization inhibitors and or antireversion agents in a composition or vulcanizable elastomeric formulation of the present invention provides for the widest range of processability while providing for high performance vulcanized articles after vulcanization, vulcanization at higher temperatures and improved performance in higher temperature environments. Improved performance vulcanized articles may also be formed from vulcanizable elastomeric formulations or vulcanizing compositions that include crosslinkers, for example at least one crosslinker selected from the group consisting of polysulfides or polysulfide mixtures such as but not limited to those described in U.S. Pat. No. 3,979,369 and WO 2014/067940 and or crosslinked organosilicon polysulfides such as but not limited to those disclosed in EP 2 557 083.

Accordingly, a suitable vulcanizable elastomeric formulation includes at least one elastomer; at least one of an antireversion agent, a prevulcanization inhibitor and a retarder; and a vulcanizing agent, wherein the vulcanizing agent comprises a cyclododecasulfur compound. It will thus be understood by one of ordinary skill in the art that the vulcanizing composition may further include any additive which retards the conversion of cyclododecasulfur into cyclooctasulfur, which is thermodynamically more stable under ambient conditions A suitable activator is zinc stearate, preferably formed directly in the composition by adding zinc oxide and stearic acid. Suitable antioxidants include thioesters and amines such as alkylated diphenylamines, para-phenylenediamines available from Eastman Chemical Company under the name Santoflex™; phenols and hydroquinolines and the like. Suitable tackifiers include hydrocarbon resin additives such as those available from Eastman Chemical Company under the name Impera™. A suitable anti-fatigue agent is polymerized 2,2,4-trimethy-1,2-dihydroquinoline (TMQ), commercially available as VULCANOX™. Suitable antiozonants include aniline derivatives, diamines and thioureas. Suitable antidegradants include ultraviolet agents such as substituted benzotriazoles and substituted benzophenones. Suitable pigments and dyes include iron oxide, titanium dioxides, organic dyes, carbon black, zinc oxide and hydrated silicon compounds.

The amounts of the elastomer and the vulcanizing agent cyclododecasulfur compound in the vulcanizable elastomeric formulation of the present invention will vary depending on a number of factors, for example intended processing conditions, concentration of vulcanizing agent in the vulcanizing composition (when such a composition is utilized) and the mechanical and other performance requirements of the resulting elastomeric article. Typically, the amount of vulcanizing agent cyclododecasulfur compound in the vulcanizable elastomeric formulation of the present invention is from 0.25 to 30 weight percent cyclododecasulfur compound based on the total weight of the elastomeric formulation. Accordingly, the vulcanizing composition may be present in the vulcanizable elastomeric formulation in an amount sufficient to supply to the elastomeric formulation from 0.3 to 43 weight percent cyclododecasulfur based on the total weight of the elastomeric formulation when the cyclododecasulfur is present in the vulcanizing composition at about 80 weight percent.

In another aspect, the present invention is directed to a process for making a vulcanizable elastomeric formulation. The process generally includes mixing an elastomer with a vulcanizing agent to form a vulcanizable elastomeric formulation that includes the vulcanizing agent dispersed in an elastomer, wherein the vulcanizing agent includes a cyclododecasulfur compound. Preferably, the cyclododecasulfur compound is characterized by a DSC melt point onset of from about 155° C. to about 167° C., more preferably between 157° C. and 167° C. when measured at a DSC heat rate of 20° C./minute and most preferably between 160° C. and 167° C. when measured at a DSC heat rate of 20° C./minute. As the vulcanizing agent cyclododecasulfur compound is preferably mixed with the elastomer as component of a vulcanizing composition, the mixing step of the process preferably includes the step of combining a vulcanizing composition with an elastomer to form a vulcanizable elastomeric formulation, wherein the vulcanizing composition includes a vulcanizing agent that includes a cyclododecasulfur compound.

In another aspect, the present invention is directed to a process for forming a vulcanized elastomeric article. This process generally includes the process steps described above for making a vulcanizable elastomeric formulation followed by forming the vulcanizable elastomeric formulation into a formed shape and vulcanizing the formed shape to form a vulcanized elastomeric article. Accordingly, in one embodiment, the process includes a) mixing an elastomer with a vulcanizing agent to form a vulcanizable elastomeric formulation that includes the vulcanizing agent dispersed in the elastomer, wherein the vulcanizing agent includes a cyclododecasulfur compound; b) forming the vulcanizable elastomeric formulation into a formed shape; and c) vulcanizing the formed shape to form a vulcanized elastomeric article. The step of "forming" the vulcanizable elastomeric formulation as used herein typically includes one or more steps, such as for example mixing, calendering, extruding and other processing, shaping or forming steps, often applied to a vulcanizable elastomeric formulation by vulcanized article manufacturers during the manufacture of elastomeric articles such as tires and tire components. One of ordinary skill will appreciate that, to the extent optional ingredients or materials such as for example the antireversion agents, prevulcanization inhibitors, crosslinkers and accelerators described herein, are desired in conjunction with the process of the present invention, they may be added to the vulcanizable elastomeric formulation as a component of the vulcanizing composition or simply added during the mixing step.

As the vulcanizing agent cyclododecasulfur compound of the vulcanizing composition of the present invention exhibits improved thermal stability over prior art sulfur vulcanizing agents, an important aspect of the present invention is that the temperatures utilized in processes for forming vulcanizable elastomeric formulations, as well as the temperatures such formulations are subjected to in the manufacture of vulcanized elastomeric articles employing such formulations, can with the present invention readily exceed the temperature limits imposed by the thermal stability characteristics of prior art vulcanizing agents. In one embodiment, therefore, at least one of the mixing and forming steps in the present process for forming a vulcanized elastomeric article may include increasing the bulk average processing temperature of the vulcanizable elastomeric formulation to greater than 125° C., preferably greater than 128° C., more preferably greater than 130° C., even more preferably greater than 135° C., for at least a portion of the step. Accordingly, the bulk average processing temperature of the vulcanizable elastomeric formulation during at least one of the mixing and forming steps is greater than 125° C., preferably greater than 128° C., more preferably greater than 130° C., even more preferably greater than 135° C. for at least a portion of the forming step. As an element of this aspect, the present invention also includes a vulcanized article formed from the vulcanized formulation of the present invention, more preferably a vulcanized elastomeric article formed from the vulcanized elastomeric formulation of the present invention.

Those skilled in the art will readily appreciate, in view of the present disclosure, that even higher temperatures than those cited herein may be used for short periods of time, the limitation being the entire time-temperature history or "thermal budget" of the entire process. One can therefore afford longer times at lower temperatures and even higher temperatures for relatively shorter periods of time.

In another embodiment, the process includes (a) mixing an elastomer with a vulcanizing agent to form a vulcanizable elastomeric formulation that includes the vulcanizing agent dispersed in the elastomer; (b) forming the vulcanizable elastomeric formulation into a formed shape; and (c) vulcanizing the formed shape to form said vulcanized elastomeric article; wherein the at least one of the mixing and forming steps includes increasing the bulk average processing temperature of the vulcanizable elastomeric formulation to greater than 125° C., preferably greater than 128° C., more preferably greater than 130° C., even more preferably greater than 135° C., for at least a portion of that step. In this embodiment, the vulcanizing agent preferably includes a cyclododecasulfur compound, more preferably a cyclododecasulfur compound characterized by a DSC melt point onset of from about 155° C. to about 167° C. when measured at a DSC heat rate of 20° C./minute.

In the above description of the processes of the present invention, "bulk average processing temperature" is chosen as a temperature measurement parameter in view of the common practice in commercial vulcanized elastomeric article manufacture to employ a set of thermocouples to measure temperature during mixing and forming steps. These thermocouples provide a limited number of temperature data points (correlating to the number of thermocouples) as to the temperature of the formulation at certain locations within the formulation mass as it proceeds through the process steps. The "bulk average processing temperature" is therefore meant to mean the arithmetic average of a reasonable number (reasonable being greater than 1) of temperature measurements of the elastomeric formulation mass taken during at least one of the mixing and forming steps.

One of ordinary skill in the art will appreciate, however, that other temperature measurement techniques may be or may become available that allow for a more thorough temperature analysis of the elastomeric formulation mass. By way of non-limiting example, thermal imaging may be utilized to measure the bulk average processing temperature of a formulation mass. In thermal imaging techniques, each pixel essentially functions as a discrete thermometer; therefore, such techniques can provide more comprehensive localized data regarding the formulation, especially when high resolution thermal imaging is utilized. Such techniques may allow measurement of hundreds, or even thousands, of points on a formulation mass that may simply be averaged in order to obtain a bulk average processing temperature of the formulation. Those skilled in the art will readily appreciate that a more meaningful measurement will be obtained with thermal imaging in cases where the formulation is being actively manipulated so that interior portions of the formulation mass that may be at an elevated temperature are quickly brought to the surface at the time the thermal measurement is taken. If thermal imaging is instead used on a formulation mass that has been at rest for an extended period, the external portion of the formulation will have cooled with respect to the interior portions of the mass such that an artificially low bulk average processing temperature measurement will be obtained.

The "bulk average processing temperature" as used herein should be distinguished from "point processing temperatures" taken in isolation, that is, a temperature at a measurable point in the elastomeric formulation mass during at least one of the mixing and forming steps that is not representative of the overall temperature, or bulk average processing temperature, of the formulation mass, and in fact may be substantially higher than the bulk average processing temperature of the formulation mass. Accordingly, in another embodiment of the process of the present invention for forming a vulcanized elastomeric article, at least one of the mixing and forming steps includes increasing a point processing temperature of the vulcanizable elastomeric formulation to greater than 135° C., preferably greater than 140° C., more preferably greater than 150° C., even more preferably greater than 160° C., and even more preferably greater than 165° C., for at least a portion of that step.

One of ordinary skill in the art will recognize that another benefit of the present invention, most evident from the elevated process temperature aspects thereof, is that the portfolio of optional additives available for use in the compositions, formulations and processes of the present invention may be different from those used with conventional vulcanizing agents. For example, additives that may not be sufficiently active at lower processing temperatures may be used with the vulcanizing agents of the present invention. Such additives may include for example crosslinkers based on polysulfides as discussed above and non-amine containing accelerators such as for example at least one accelerator selected from the group consisting of 2-mercaptobenzothiazole, 2-mercaptobenzothiazole disulfide and asymmetric disulfides based on 2-mercaptobenzothiazole and a non-accelerating mercapto containing moiety such as 2-(cyclohexyldisulfaneyl)benzothiazole.

Conversely, additives that may be effective at conventional processing temperatures may be too active, unstable or materially less effective at the elevated temperatures of the present invention. In such a scenario, suitably active and stable materials such as those antireversion agents, prevulcanization inhibitors, polysulfidic crosslinking agents and other classes of materials described herein should be preferentially utilized.

A further aspect of the present invention is that the elevated processing temperatures enabled by cyclododecasulfur may reduce or eliminate the need for the use of resin replacements, such as for example the bonding or hardening resins described below, in rubber formulations. In practice, practical upper limits exist for the use of conventional insoluble sulfur since it is quite difficult to carry out such processes without even a small amount of conversion of the insoluble sulfur to cyclooctasulfur, resulting in unwanted bloom. So, for example in many formulations, even if only 10% of conventional insoluble sulfur reverts, then loadings of about 6-7 wt. % may yield cyclooctasulfur concentrations at or above the threshold for bloom, even at conventional processing temperatures.

Compounders therefore frequently employ hardening or bonding resins to achieve a higher modulus in cases where the amount of insoluble sulfur needed would otherwise exceed the threshold for bloom. These resins are typically based on resorcinol, phenol, cashew nut oil or other similar materials reacted with formaldehyde or formaldehyde donors such as hexamethylene tetramine or hexamethoxymethylol melamine. These resins allow a higher modulus to be achieved, but contribute additional complications to the elastomeric vulcanizable formulations. The resins have low inherent solubility in general purpose elastomers and thus may themselves be a source of bloom. These resins also contribute processing complications, as their presence increases the vulcanizable elastomeric composition viscosity which limits practical processing speeds and temperatures.

Further, the vulcanizates prepared using these bonding or hardening resins are inferior to a high sulfur composition of similar modulus. Bonding and hardening resin formulations suffer from irreversible strain-dependent softening. That is to say, when these articles are subjected to increasing strains, the network formed by the bonding hardening resin will be permanently disrupted leading to a softer more hysteretic article. High modulus compositions prepared from sulfur and sulfur containing vulcanizing agents produce a more durable, more strain independent product. One skilled in the art will recognize that higher modulus, less strain-dependent components which exhibit lower hysteresis are particularly suitable for use in large off-the-road tires such as those used in earthmoving vehicles and construction or excavating equipment and particularly useful in the transportation industry for use in light, medium or heavy trucks and passenger tires. More importantly, preparing more durable components is instrumental in the light-weighting of tires and manufacturing of run-flat designed tires. Reducing strain softening of tires used in earth moving or in mining operations is highly desirable as improving this feature will immediately make construction and mining operations more profitable. This is so important that many tires used in such industries have "ton-mile-per hour" ratings.

According to the invention, the outstanding thermal stability of the cyclododecasulfur of the present invention allows for processing of rubber compositions at higher temperatures with less bloom. Hence, formulations of natural rubber, butadiene rubber, styrene-co-butadiene or other general purpose elastomers, as already described, with from 10 to 40 phr of cyclododecasulfur are practical for modern factory processing, and may thus reduce or eliminate the need for resin replacements. One skilled in the art will readily recognize that these elevated levels of sulfur in elastomeric compositions characterize "ebonite" and like materials.

In another aspect, the present invention is directed to a vulcanizing agent masterbatch. A vulcanizing agent masterbatch, also known as a concentrate, is a combination of ingredients purposefully formed at elevated active ingredient (e.g. vulcanizing agent) concentrations in an appropriate elastomeric carrier such that, when subsequently combined with or "let down" into an elastomer, a final vulcanizable elastomeric formulation having the desired final active ingredient concentrations is formed. The vulcanizing agent masterbatch of the present invention includes (i) a vulcanizing agent in the amount of from 40 to 90 weight percent of based on the total weight of the masterbatch and (ii) an elastomeric carrier, wherein the vulcanizing agent includes a cyclododecasulfur compound. Preferably, the cyclododecasulfur compound is characterized by a DSC melt point onset of from about 155° C. to about 167° C. when measured at a DSC heat rate of 20° C./minute.

Examples of suitable elastomeric carriers are the elastomers listed above as suitable for the vulcanizable elastomeric formulation of the present invention and may include but not be limited to natural rubber or any synthetic rubber, such as natural rubber (NR), styrene-butadiene rubber (SBR), butadiene rubber (BR), nitrile rubber (NBR), ethylene propylene (EP) or ethylene propylene diene monomer (EPDM), and the like. Preferably, the elastomeric carrier is selected to match or be compatible with the elastomer with which the masterbatch is combined when forming a final vulcanizable elastomeric formulation having the desired final active ingredient concentrations. The vulcanizing agent masterbatch may optionally also include other additives conventionally used in rubber processing and vulcanized article manufacture as listed above as optional for the vulcanizable elastomeric formulation of the present invention, including flow/processing aids, antioxidants, antidegradants, fatty acids, zinc oxide, accelerators, extenders, adhesion promoters, activators, bonding agents, buffers, fillers, pigments, anti-reversion agents, prevulcanization inhibitors, acid retarders, plasticizers or other compounding ingredients or additives to further enhance the characteristics and/or improve the performance of the elastomeric formulation or the elastomeric article from which it is formed.

The present invention is also directed to a cyclododecasulfur compound characterized by a DSC melt point onset of from about 155° C. to about 167° C. when measured at a DSC heat rate of 20° C./minute. More preferably the DSC melt point onset is between 157° C. and 167° C. when measured at a DSC heat rate of 20° C./minute and most preferably the DSC melt point onset is between 160° C. and 167° C. when measured at a DSC heat rate of 20° C./minute. An important aspect of the cyclododecasulfur compounds of the present invention is that they have unexpectedly been found to exhibit an elevated melting point relative to known forms of cyclododecasulfur and therefore have been surprisingly identified as a particularly suitable vulcanizing agent for the vulcanizing composition of the present invention.

In forming each of A-1, C-1 and C-2, a Brabender mixer was preheated to 80° C. then P-1 was loaded into the mixer and mixed at @ 50 rpm for 30 minutes seconds. Mixer speed was then reduced to 35 rpm; the sulfur ingredient and accelerator added; and the resulting composition mixed at 35 rpm for an additional 90 seconds. The material was then discharged from the mixer, its temperature recorded and sheeted on a 80° C. mill.

The specific surface area, also known as the "BET" area, is a well-known measurement wherein specific surface area of a particulate material or powder is determined by physical adsorption of a gas on the surface of the solid and by calculating the amount of adsorbate gas corresponding to a multi-layer on the surface based on the Brunauer, Emmett and Teller (BET) adsorption isotherm equation. The median particle diameter, sometimes referred to as "D50", is a parameter typically used in the art to give a general indication as to the coarseness of a material. The polydispersity ratio, also referred to as "D90/D10", is a parameter that functions as an indication of the uniformity of the distribution of particle sizes. D90 is the diameter at which 90% of a sample's mass is comprised of smaller particles while D10 is the diameter at which 10% of a sample's mass is comprised of smaller particles. Accordingly, D90/D10 is the ratio of these two values.

Equipment and methods for determining particle diameters as required for D50 and D90/D10 measurements are well known in the art and commercially available, for example: Malvern (Mastersizer series), Horiba (LA series), Sympatec (Helos series) and Shimadzu (SALD series). Methods for determining the Nitrogen adsorption isotherm in conjunction with determining specific surface area, such as ASTM-D1993-03 (2013), are well known in the art. Further, equipment for determining the Nitrogen adsorption isotherm are well known and commercially available, for example from Micromeritics (Tristar II series) and Quantachrome (Nova series).

In general, the cyclododecasulfur compounds of the present invention are synthesized according to a process that includes (i) reacting cyclooctasulfur, tetramethylethylenediamine and zinc to form a tetramethylethylenediamine/$ZnS_6$ complex; and (ii) reacting said complex with an oxidizing agent under exothermic reaction conditions to form a cyclododecasulfur-containing reaction mixture that may include one or more unreacted reactants, by-products and impurities. Suitable oxidizing agents include without limitation bromine, chlorine, and thiocyanogen. Preferably, the process further includes isolating cyclododecasulfur from the cyclododecasulfur-containing reaction mixture. A suitable technique for the isolating step includes for example dissolving and recrystallizing the cyclododecasulfur from the cyclododecasulfur-containing reaction mixture, preferably using solvents selected from the group consisting of $CS_2$ and aromatic solvents.

The following examples, while provided to illustrate with specificity and detail the many aspects and advantages of the present invention, are not be interpreted as in any way limiting its scope. Variations, modifications and adaptations which do depart of the spirit of the present invention will be readily appreciated by one of ordinary skill in the art.

Analytical Methods

Differential scanning calorimetry (DSC)—The differential scanning calorimetry method (DSC) to measure the melt point onset and melting point range of the cyclododecasulfur compound involves a first heating scan, from which are determined the melting peak temperature(Tm1) and the exothermic peak temperature (Tex1). The instrument used was a TA's Q2000 DSC (RCS) with a refrigerated cooling system. The procedure used is described herein as follows. The instrument was calibrated according to the manufacturers "User's Manual"; by setting the onset of the melting point of adamantane, indium and lead at −65.54° C., 156.60° C. and 327.47° C., respectively, and heat of fusion of indium at 6.8 cal/g. A calibration specimen of about 3.0 mg was then scanned at a rate of 20° C./min. in the presence of helium with a flow rate of 50 cc/min. For sulfur-containing specimens, a similar method was used. A TA's Tzero aluminum pan and lid along with two aluminum hermetic lids were tared on a balance. About 3.0 mg of the sulfur-containing specimen was weighed into the Tzero pan, covered with the tared lid, and crimped using a TA's sample crimper with a pair of "Black" dies. The crimped specimen from the "Black" die stand was moved to the "Blue" die stand, where two tared hermetic lids were placed on the top of the specimen pan and crimped with the top "Blue" die. An empty crimped Tzero aluminum pan and lid along with 2 hermetic lids was prepared in a similar fashion as reference. The specimen and reference pans were placed in the DSC tray and cell at room temperature. After the DSC was cooled to −5° C. using a refrigerated cooling system, the specimen was heated from −5 to 200° C. at a rate of 20° C./min in the presence of helium. "DSC melt point onset" is defined as the temperature at the start of the endothermic melting event. Data analysis was performed using TA's software, Universal V4.7A, wherein, Tm1 refers to the low melting peak temperature occurring on the melting curve, using analysis option, "Signal Maximum". Tex1 refers to the exothermic peak temperature occurring right after Tm1, using analysis option, "Signal Maximum".

UniQuant (UQ)—Samples were also analyzed using X-ray fluorescence and the UniQuant software package. UniQuant (UQ) is an x-ray fluorescence (XRF) analysis tool that affords standardless XRF analysis of samples. Samples can then be semi-quantitatively analyzed for up to 72 elements beginning with row three in the periodic table (i.e. Na to higher Z). The data are mathematically corrected for matrix differences between calibration standards and samples as well as absorption and enhancement effects; i.e. inter-element effects. Some factors that can affect the quality of results include granularity in the sample (leading to shadow effects), mineralogical effects (due to sample inhomogeneity), insufficient sample size, and lack of knowledge of the sample matrix. In cases where a sample was amenable to both XRF UQ analysis and ICP-OES (i.e. quantitative) analysis generally agree within +/−10%. Samples were analyzed for Zn, Br, Cl, and S content by UQ.

NMR—Weigh approximately 0.0200 g of sample into a vial. Weigh approximately 0.0200 g of the internal standard, 1,4-dimethoxybenzene, into the same vial. Add approximately 1 mL of pyridine-d5, or other deuterated solvent that the material is soluble in. Take a $^1H$ NMR of the material and integrate the peak at δ 3.68 (6 protons). Integrate the two peaks at δ 2.45 and δ 2.25 (16 protons). Calculate the % purity using the following equation.

% Purity=100[(mg IS/MW IS)*(∫ sample/∫ IS)*
(6/16)*(MW sample/mg sample)]

IS=internal standard
MW=molecular weight
∫=value of the integration from the $^1H$ NMR Raman Spectroscopy—Raman spectrum was measured using a Renishaw inVia confocal Raman microscope and WiRE 4.1 software with a 785 nm excitation laser and a 5× magnification microscope objective.

Example 1—Preparation of (TMEDA)$ZnS_6$ Complex

Tetramethylethylenediamine (TMEDA), (408 grams) and methanol (72 grams) were added to a 3 L, 3-neck glass flask equipped with a mechanical stirrer (reaching closely to the vessel walls), thermocouple, $N_2$ bubbler, water condenser, and electrical heating mantle. The system was purged with nitrogen and the temperature of the mixture adjusted to 35° C. Freshly ground cyclooctasulfur (powder) was added over five minutes while maintaining stirring at 425-450 rpm. The temperature was increased to 45° C., whereupon 40 grams of metallic zinc powder (<10 micron particle size, >98% purity) was added over five minutes while maintaining stirring at 425-450 rpm. The gray-greenish yellow reactor contents were then heated slowly to 86° C. and agitated for 4 hours, or until yellow. Once yellow, the mixture was held for an additional two hours at temperature, with agitation. At the end of the reaction time, the flask was cooled to room temperature, the agitator turned off, and free liquid removed by vacuum extraction. Methanol (600 ml) was added to the flask to create a slurry, and agitated for one hour. The resulting slurry was then filtered on a vacuum Buchner filter (1 micron paper) and washed with two portions of 200 ml each of methanol. The solids were removed from the filter and dried overnight in a vacuum oven set at 50° C. and 0.1 MPa. Yield was close to quantitative, with 233 grams of (TMEDA) $ZnS_6$ complex, 97.5% purity by NMR analysis per the above procedure.

Example 2—Preparation of Cyclododecasulfur of Present Invention ($S_{12}$) from (TMEDA)$ZnS_6$ Complex Methylene chloride (750 mL) was added to a 2 L, 4-neck glass flask equipped with a mechanical stirrer, thermocouple, $N_2$ bubbler and stopper. Bromine (16.7 g, 104.5 mmol, 1.0 eq) was weighed into a bottle containing 50 mL $CH_2Cl_2$ and this mixture was added to the flask. The solution was cooled to 4° C. The zinc complex, (TMEDA)$ZnS_6$, from Example 1, (97.5% pure) (40 g, 104.3 mmol, 1.0 eq), was added all at once and washed in with 50 mL $CH_2Cl_2$. There was an immediate exotherm to 11° C. The solution was stirred for 15 minutes, filtered, washed with cold $CH_2Cl_2$ and suctioned dry. The solids were slurried in THF (250 mL), filtered and suctioned dry. The resultant solids were slurried in cold $CS_2$ (155 mL), filtered and suctioned dry to afford 10.2 g of a pale yellow solid. (yield 50.8% based on sulfur in the zinc complex). Evaluation using the UQ elemental analysis method described above showed the material to be 96.6% sulfur (all cyclododecasulfur ($S_{12}$) and sulfur polymer by Raman spectroscopy), 2.67% zinc and 0.7% bromine.

The cyclododecasulfur was further purified in a two-vessel system comprising an upper 2 L, jacketed 3-neck glass flask equipped with a mechanical stirrer, fine glass fritted filter plate, thermocouple, $N_2$ bubbler, dry ice trap, and bottom valve; and a lower 2 L, jacketed 3-neck glass flask equipped with a mechanical stirrer, water-cooled condenser and 1 L glass receiver pot, thermocouple, $N_2$ bubbler, dry ice trap, and bottom valve. To initiate the purification procedure, carbon disulfide (1200 grams) was added the upper vessel along with the cyclododecasulfur from the above reaction step (10.2 g). The contents of the flask were heated to 40-42° C. with stirring. After agitation of the mixture for half of an hour, the bottom valve of the vessel was opened, and the free liquid pulled through the fritted glass filter into the lower flask. About half of the initial solids remained on the filter. The solution in the second vessel was cooled to −6° C. over a period of 20 minutes or less. During the cooling phase, fine light yellow crystalline cyclododecasulfur formed. The solution was stirred for about 15 minutes at a final temperature of −6° C., whereupon the bottom valve of the vessel was opened and the slurry of $S_{12}$-$CS_2$ was dropped onto a Buchner funnel fitted with 2 micron filter paper. The light yellow crystalline cyclododecasulfur was suctioned dry and scraped from the filter paper. The mother liquor from the final filtration was returned to the upper vessel, (containing residual solids), along with makeup $CS_2$ to give 1200 grams of liquid. The upper vessel was agitated and heated again to 40-42° C. and the filtering-cooling procedure was repeated to recover a second crop of purified cyclododecasulfur ($S_{12}$) crystals. After the final heating-dissolution step, about 0.26 grams of greenish-yellow solids remained on the upper fritted filter. The combined wet $S_{12}$ crystals were placed in a vacuum oven overnight at 30° C. and about 0.01 MPa to remove residual $CS_2$, to give 9.3 grams of dried, purified cyclododecasulfur. Evaluation by the UQ elemental method described above showed the material to be at least 99.9% sulfur (all $S_{12}$ by Raman), and less than 100 ppm of zinc and bromine. The melting point was determined first by DSC and then using a thermal resistance melting point apparatus to be 162° C. and 157° C. respectively. Overall yield of sulfur to $S_{12}$ was 46%.

Example 3—Comparison of Melting Points of Cyclododecasulfur Materials

Several batches of purified cyclododecasulfur of the present invention were prepared following the procedures exemplified by Examples 1 and 2. Each final purified material was analyzed by Raman, Uniquat® or ICP, and melt point onset measured using DSC as described above. The results are set forth in Table 1 below along with "control" cyclododecasulfur melt points extrapolated from reported data measured at a DSC heat rate of 10° C./min, 5° C./min and 2.5° C./min in Steudel, R.; Eckert, B., "Solid Sulfur Allotropes", Topics in Current Chemistry (2003).

TABLE 1

| Sample | Melting point, ° C. |
| --- | --- |
| Invention Batch 1 | 166.0 |
| Invention Batch 2 | 156.0 |
| Invention Batch 3 | 159.3 |
| Invention Batch 4 | 158.6 |
| Invention Batch 5 | 162.4 |
| Invention Batch 6 | 164.0 |
| Invention Batch 7 | 161.5 |
| Control | 153.5 |

As shown above, the cyclododecasulfur compound of the present invention exhibits a melt point onset materially and unexpectedly higher than prior art cyclododecasulfur compounds. Observed variations in melt point for the present invention were expected due to degree of impurities in the samples as detected by Raman.

As noted above, thermal stability (or resistance to thermal degradation or reversion to soluble sulfur) is an important parameter in selecting a suitable vulcanizing agent. The thermal stability performance of the present invention in mixing was demonstrated in this example 3 by mixing a previously formed composition set forth in Table 2 below with either 5.0 phr of commercially available polymeric sulfur (as 6.25 g Crystex® HD OT20 available from Eastman Chemical Company) to form control vulcanizable elastomeric formulations or 5.00 phr of the cyclododecasulfur of the present invention to form vulcanizable elastomeric formulations of the present invention. One (1.0) phr of a conventional vulcanization accelerator, N,N'-Dicyclohexyl-2-mercaptobenzothiazole sulfenamide (DCBS), was also added to each vulcanizable elastomeric formulation. Mixing was performed using a Kobelco 1.6 L laboratory mixer equipped with 4 wing H rotors. Formulations and discharge temperatures for the six sample items created per the above procedure are set forth below in Table 3.

TABLE 2

| Component | phr |
| --- | --- |
| Natural Rubber TSR-10 | 100 |
| N-339 Carbon Black | 50 |
| Zinc Oxide | 8 |
| Stearic Acid | 2 |
| N1-(4-methylpentan-2-yl)-N4-phenylbenzene-1,4-diamine (6-PPD) | 2 |
| Total | 162 |

TABLE 3

| Item number | 1 | 2 | 3 | 4 | 5 | 6 |
|---|---|---|---|---|---|---|
| Table I Masterbatch (phr) | 162 | 162 | 162 | 162 | 162 | 162 |
| DCBS (phr) | 1 | 1 | 1 | 1 | 1 | 1 |
| Polymeric Sulfur (phr) | | 6.25 | 6.25 | 6.25 | | |
| Cyclododecasulfur (phr) | 5.00 | | | | 5.00 | 5.00 |
| Total | 168.00 | 169.25 | 169.25 | 169.25 | 168.00 | 168.00 |
| Target Rubber discharge Temperature (° C.) | 140 | 150 | 130 | 140 | 150 | 130 |

For each sample item, the sample was discharged from the mixer and sheeted on a two roll mill equilibrated to 70° C. The rubber content of each sample was then extracted with dioxane and the soluble sulfur content of each item determined by HPLC (Agilent 1260 high performance liquid chromatography). Target temperatures, actual rubber temperature after discharge and cyclooctasulfur content reported as a percentage of initial sulfur material, is given below in Table 4.

TABLE 4

| Item number | 1 | 2 | 3 | 4 | 5 | 6 |
|---|---|---|---|---|---|---|
| Target Temperature (° C.) | 140 | 150 | 130 | 140 | 150 | 130 |
| Discharged Rubber Temperature (° C.) | 139 | 151 | 131 | 137 | 146 | 131 |
| % cyclooctasulfur Recovered | 15.12 | 97.04 | 38.69 | 91.34 | 49.80 | 7.91 |

As demonstrated by the above, the cyclododecasulfur of the present invention exhibits markedly reduced reversion to cyclooctasulfur (and therefore improved thermal stability in rubber mixing processes) when compared to current commercially available polymeric sulfur vulcanizing agents. Further examples below also describe formation of vulcanizable elastomeric formulations of the present invention that are then subsequently tested for thermal stability/bloom resistance and also evaluated to demonstrate the efficacy of the compound of the present invention as a vulcanizing agent.

Example 4—Forming Vulcanizable Elastomeric Formulations that Include the Cyclododecasulfur Compound of the Present Invention As a first step, a precursor composition P-1 of conventional materials used in the manufacture of elastomeric articles was prepared by combining the following ingredients:

TABLE 5

| Composition P-1 | |
|---|---|
| Ingredient | Amount (phr) |
| Natural Rubber | 100 |
| Carbon Black | 50 |
| ZnO | 8 |

TABLE 5-continued

| Composition P-1 | |
|---|---|
| Ingredient | Amount (phr) |
| Stearic Acid | 2 |
| 6PPD | 2 |

A vulcanizable elastomeric formulation of the present invention (Sample A-1) was then prepared as follows:

TABLE 6

| A-1 | |
|---|---|
| Ingredient | Weight (gms) |
| P-1 | 81 |
| DCBS | 0.5 |
| Cyclododecasulfur | 2.5 |

For comparison, control vulcanizable elastomeric formulations C-1 and C-2, were also prepared by substituting the cyclododecasulfur of the present invention in the composition described above with polymeric sulfur (for C-1) and cyclooctasulfur (rhombic or soluble) sulfur (C-2) as follows:

TABLE 7

| C-1 | |
|---|---|
| Ingredient | Weight (gms) |
| P-1 | 81 |
| DCBS (vulcanization accelerator) | 0.5 |
| Polymeric sulfur (in the form of 3.13 g Crystex ® HD OD20 commercially available from Eastman Chemical Company) | 2.5 |

TABLE 8

| C-2 | |
|---|---|
| Ingredient | Weight (gms) |
| P-1 | 81 |
| DCBS (vulcanizing accelerator) | 0.5 |
| Cyclooctasulfur (S8) | 2.5 |

In forming each of A-1, C-1 and C-2, a Brabender mixer was preheated to 80° C. then P-1 was loaded into the mixer and mixed at @50 rpm for 30 minutes. Mixer speed was then reduced to 35 rpm; the sulfur ingredient and accelerator added; and the resulting composition mixed at 35 rpm for an additional 90 minutes. The material was then discharged from the mixer, its temperature recorded and sheeted on a 80° C. mill.

Example 5—Thermal Stability Testing

The vulcanizable elastomeric formulations A-1 and C-1 above were placed in a preheated to about 88° C. Brabender internal mixer with the rotor speed initially set to 35 rpm. The rubber was mixed and the rotor speed was adjusted, faster or slower, such that the rubber mixture in the mixer was maintained at 125° C. for extended times to simulate possible commercial plant processing conditions such as extrusion or calendering operations. Samples were extracted from the mixer at various times as indicated in Table 9 below and the weight percent cyclooctasulfur (as the product of degradation/reversion of both polymeric sulfur and the cyclododecasulfur of the present invention) of the sample was measured using the method for cyclooctasulfur measurement described in Example 3 above. The results for weight percent cyclooctasulfur are shown in the following table 9:

TABLE 9

Wt % cyclooctasulfur in extended rubber mixes

| Time | 2 min | 4 min | 6 min | 8 min | 10 min |
|---|---|---|---|---|---|
| A-1 | 0.2 | 0.49 | 0.95 | 1.525 | 2.15 |
| C-1 | 2.15 | 2.45 | 2.7 | 2.8 | 2.85 |

At the 125° C. processing temperatures of Table 9 above, polymeric sulfur has already exceeded the bloom threshold level by almost 3× when the first sample is taken at two minutes whereas the cyclododecasulfur of the present invention may be processed on the order of 5 minutes at 125° C. before reaching the threshold bloom level. This unexpected advantage is particularly critical as many commercial factory process steps are completed in less than two minutes and often less than one minute at higher temperatures in order to maximize throughput, efficiency and production volume.

Example 6—Vulcanization Efficacy

Multiple samples of vulcanizable elastomeric formulation A-1, C-1 and C-2 were separately vulcanized at 130, 140, 155, 160, 167, and 180° C. using the Alpha Technologies Moving Die Rheometer, with four parameters related to vulcanization rates and efficiencies (Maximum Torque, Scorch Time, $t_{90}$ and Maximum rate of vulcanization) measured during the vulcanization process. Maximum Torque (MH) is a measure of the formed network density with increases in modulus directly related to increases in crosslink density. Scorch Time ($ts_2$), also known as onset of cure, is defined as the time required for the system to show a torque increase of 2 dNm above the minimum measured torque. $T_{90}$ is the time required to reach 90% state of cure. Maximum rate of vulcanization (Rh) is a measure of the fastest rate of vulcanization observed during the curing cycle. The results from testing these four parameters are set forth in Tables 10 through 13 below.

TABLE 10

| Cure Property MH | Cure Temperature, ° C. | C-1 in dNM | A-1 | C-2 |
|---|---|---|---|---|
| | 130 | 26.8 | 27.4 | 27.8 |
| | 140 | 25.4 | 26.2 | 26.4 |
| | 155 | 23.8 | 24.6 | 24.7 |
| | 160 | 22.3 | 23.1 | 23.1 |
| | 167 | 21.0 | 21.8 | 21.9 |
| | 180 | 20.0 | 20.7 | 20.8 |

TABLE 11

| Cure Property ts2 | Cure Temperature C. | C-1 in Minutes | A-1 | C-2 |
|---|---|---|---|---|
| | 130 | 22.1 | 22.1 | 22.2 |
| | 140 | 9.1 | 9.5 | 9.6 |
| | 155 | 3.9 | 4.2 | 4.1 |
| | 160 | 1.7 | 1.9 | 1.8 |
| | 167 | 0.8 | 0.9 | 0.9 |
| | 180 | 0.5 | 0.5 | 0.5 |

TABLE 12

| Cure Property t90 | Cure Temperature C. | C-1 in Minutes | A-1 | C-2 |
|---|---|---|---|---|
| | 130 | 80.4 | 80.1 | 80.8 |
| | 140 | 37.9 | 37.9 | 38.7 |
| | 155 | 18.0 | 18.2 | 18.4 |
| | 160 | 8.7 | 8.8 | 8.9 |
| | 167 | 4.3 | 4.4 | 4.4 |
| | 180 | 2.3 | 2.3 | 2.3 |

TABLE 13

| Cure Property Rh | Cure Temperature C. | C-1 dNM/minute | A-1 | C-2 |
|---|---|---|---|---|
| | 130 | 0.6 | 0.6 | 0.6 |
| | 140 | 1.1 | 1.1 | 1.1 |
| | 155 | 1.9 | 2.0 | 2.0 |
| | 160 | 3.4 | 3.6 | 3.6 |
| | 167 | 6.1 | 6.5 | 6.4 |
| | 180 | 11.1 | 11.6 | 11.6 |

The data in tables 10-13 indicate that cyclododecasulfur compound of the present invention is an effective and efficient sulfur vulcanization agent.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A process for forming a vulcanizable elastomeric formulation, said process comprising mixing an elastomer with a vulcanizing agent to form a vulcanizable elastomeric formulation that includes said vulcanizing agent dispersed in the elastomeric compound; wherein said vulcanizing agent includes a cyclododecasulfur compound.

2. The process of claim 1 wherein said cyclododecasulfur compound is characterized by a DSC melt point onset of from about 155° C. to about 167° C. when measured at a DSC heat rate of 20° C./minute.

3. The process of claim 2 wherein said cyclododecasulfur compound is characterized by a DSC melt point onset of between 157° C. to about 167° C. when measured at a DSC heat rate of 20° C./minute.

4. The process of claim 1 wherein said mixing step comprises combining a vulcanizing composition with said elastomer to form said vulcanizable elastomeric formulation, wherein said vulcanizing composition comprises said cyclododecasulfur compound.

5. A process for forming an elastomeric article, said process comprising a) mixing an elastomer with a vulcanizing agent to form a vulcanizable elastomeric formulation that comprises said vulcanizing agent dispersed in said elastomer, wherein the vulcanizing agent includes a cyclododecasulfur compound; b) forming the vulcanizable elastomeric formulation into a formed shape; and c) vulcanizing the formed shape to form a vulcanized elastomeric article.

6. The process of claim 5 wherein at least one of said mixing and forming steps comprises increasing the bulk average processing temperature of said vulcanizable elastomeric formulation to greater than 125° C. for at least a portion of said step.

7. The process of claim 5 wherein at least one of said mixing and forming steps comprises increasing the bulk average processing temperature of said vulcanizable elastomeric formulation to greater than 128° C. for at least a portion of said step.

8. The process of claim 5 wherein at least one of said mixing and forming steps comprises increasing the bulk average processing temperature of said vulcanizabie elastomeric formulation to greater than 130° C. for at least a portion of said step.

9. The process of claim 5 wherein at least one of said mixing and forming steps comprises increasing the bulk average processing temperature of said vulcanizable elastomeric formulation to greater than 135° C. for at least a portion of said step.

10. The process of claim 1 wherein said vulcanizable elastomeric formulation further comprises at least one of an antireversion agent, a prevulcanization inhibitor and retarder.

11. The process of claim 10 wherein said vulcanizing composition further comprises an antireversion agent.

12. The process of claim 11 wherein said antireversion agent is selected from the group consisting of hexamethylene-1,6-bis(thiosulfate), disodium salt, dihydrate and 1,3-bis(citraconamidomethyl)benzene.

13. The process of claim 10 wherein said vulcanizable elastomeric formulation composition further comprises a prevulcanization inhibitor.

14. The process of claim 13 wherein said prevulcanization inhibitor is N-(cyclohexylthio) phthalimide.

15. The process of claim 1 wherein said vulcanizable eiastomeric formulation further comprises at least one crosslinker selected from the group consisting of polysulfides, polysulfide mixtures and crosslinked organosilicon polysulfides.

16. The process of claim 1 wherein said vulcanizable elastomeric formulation further comprises at least one accelerator selected from the group consisting of 2-mercaptobenzothiazole, 2-mercaptobenzothiazole disulfide and asymmetric disulfides based on 2-mercaptobenzothiazole and a non-accelerating mercapto containing moiety.

* * * * *